Patented July 20, 1948

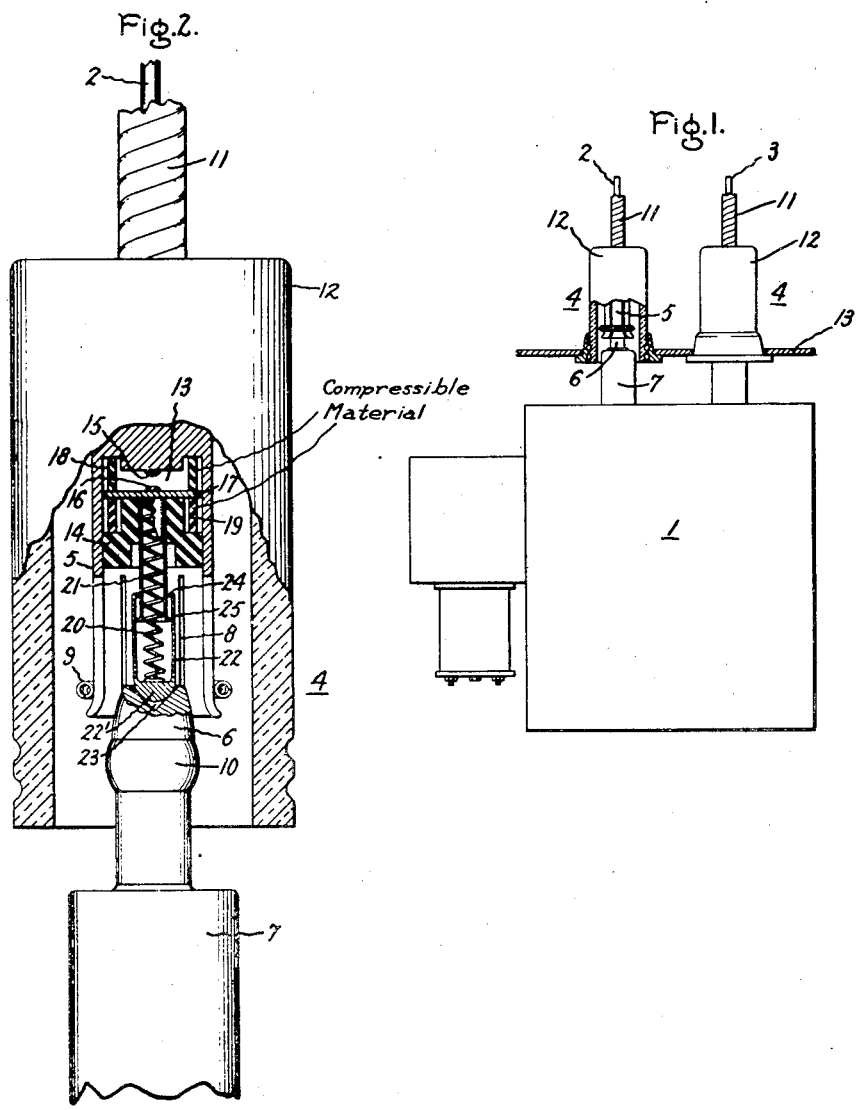

2,445,588

UNITED STATES PATENT OFFICE 2,445,588

ELECTRICAL SWITCHGEAR

Wilfred F. Skeats, Lansdowne, Pa., assignor to General Electric Company, a corporation of New York Application July 11, 1944, Serial No. 544,412

3 Claims. (Cl. 200—146)

My invention relates to electrical switchgear of the draw-out or drop-down type wherein electrical isolation of an electrical device such as a circuit breaker, with respect to associated bus bar and other circuits is accomplished by isolating or disconnect contacts which are separated in accordance with bodily movement of said electrical device.

Modern electrical switchgear often comprises metal-clad equipment in which electric circuit interrupting devices, such as circuit breakers or fuses, or auxiliary equipment, such as potential transformers or small power transformers, may be disconnected for inspection by disengaging primary disconnect contacts either by lowering the unit and then withdrawing it horizontally from the equipment if of the drop-down type, or by moving it in a horizontal direction if of the draw-out type. Inasmuch as the bus to which one set of terminals of the unit is usually connected is alive, or energized, when this operation takes place, interlocks are provided to make sure that the circuit breaker is in the open position or load removed from the transformer secondary when the primary disconnect contacts are separated. Even though this is done, there is a small amount of arcing or "spitting" at the primary disconnect contacts upon disengagement thereof due to currents of a residual nature such as those required for charging the bushing capacitances or for magnetizing the transformer core. In a great many cases this is of no consequence. However, in those installations where there is a possibility of the existence of an explosive atmosphere around the primary disconnect contacts which might be ignited by such arcing or "spitting," it is desirable to eliminate the arcing or at least render it ineffective from the standpoint of igniting the atmosphere.

A principal object of my invention is the provision of improved electrical switchgear in which any arcing upon disengagement of the primary disconnect contacts is rendered harmless as far as the surrounding atmosphere is concerned.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a side elevational view, partly in section, of an electrical device such as a circuit breaker which might preferably be an oil circuit breaker including the primary disconnect contacts by means of which such circuit breaker is connected to an associated electric circuit with these primary disconnect contacts in current carrying engagement, and Fig. 2 is an enlarged view, partly in section, of one of the primary disconnect contacts of Fig. 1 embodying my invention shown at an intermediate state during the bodily lowering of the circuit interrupting device.

Although my invention is applicable to many different types of electrical devices, it is particularly applicable to switchgear commonly referred to as metal-clad switchgear. Metal-clad switchgear comprises a stationary housing into which electric power circuits are connected, which power circuits are controlled by a cooperating electric circuit breaker mounted on a removable unit which may be of the vertical lift or the horizontal draw-out type. Movement of the unit including the circuit breaker into position in the stationary housing connects the circuit interrupting device with an associated power circuit through primary disconnect devices which usually comprise stationary portions in the housing and cooperating conductor studs on the removable unit including the circuit breaker.

In Fig. 1 I have illustrated my invention as applied to a circuit breaker of the vertical lift type which is also referred to as the "drop-down" type wherein disconnection of the circuit breaker from the associated circuit is effected merely by bodily lowering the removable unit and the associated circuit breaker. The removable unit comprising the circuit interrupting device is generally indicated at 1 and should preferably be an oil circuit breaker if the invention is used in explosive atmospheres. It will be obvious from the ensuing description that my invention is equally applicable to draw-out type switchgear as well as to the vertical lift type switchgear disclosed.

The removable unit or circuit interrupting device 1 of Fig. 1 is in a form that is particularly adaptable for central stations and substations whereby the unit can be bodily disconnected from stationary circuits, such as 2 and 3, which are respectively connected to the stationary terminals of primary disconnecting devices or disconnect contacts, generally designated at 4. These primary disconnect contacts 4 each comprise a stationary contact 5 connected to the associated electric circuit such as 2 or 3, and a movable contact 6, best shown in Fig. 2, which is the terminal of the conductor stud 7 extending from the circuit interrupting device 1 and forming a part thereof. In the drawings I have illustrated the stationary portion 5 of the disconnect contacts as a female type contact of well known construction, wherein a cylindrical member composed of copper or the like is slotted from the end, as indicated at 8, and is surrounded by a coiled or so-called garter spring 9 for insuring resilient engagement with a coacting plug contact. The movable contact 6 of the primary disconnect contacts 4 is in the form of a plug contact and is provided with a spherical contact surface 10 preferably formed of silver or the like to insure good electrical contact at the primary disconnect contacts 4.

The conductors 2 and 3 are connected to bus bars, feeder circuits, or the like and are preferably insulated as indicated at 11 in the drawing. Also the stationary portion 5 of the primary disconnect contacts is mounted within an insulating shell 12 of cylindrical configuration which is open at the bottom to permit the movable contact 6 associated with conductor stud 7 to enter. Insulating shell 12 is supported within the stationary housing structure 13 of the metal-clad switchgear, only a small portion of which is shown in Fig. 1.

The primary disconnect contacts 4 described thus far are of standard construction and have been in extensive use heretofore. Upon disengagement of the primary disconnect contacts any arcing or "spitting" by virtue of interrupting, charging or magnetizing currents, might be very undesirable in the event that an explosive atmosphere surrounds the primary disconnect contacts.

In accordance with my invention, I confine any arcing or "spitting" which occurs upon separation or disengagement of the primary disconnect contacts within a chamber which is isolated with respect to any explosive atmosphere. Accordingly, I provide within the upper closed end of socket contact 5, an arc confining chamber generally designated at 13 which is defined by the contact 5 and an insulating supporting member 14 mounted within socket contact 5 above the contacting portion thereof, as is clearly indicated in Fig. 2. The chamber 13 within socket contact 5 may be effectively sealed against the entrance of any explosive atmosphere which might surround the primary disconnect contacts 4.

In order to be sure that no arcing or "spitting" occurs between contacts 5 and 6, I provide a shunt electrical circuit in parallel with contacts 5 and 6 so that upon disengagement of contacts 5 and 6 the current flowing will be shunted through the parallel electrical circuit and be subsequently interrupted within arcing chamber 13, isolated with respect to any explosive atmosphere. This electrical circuit includes a pair of relatively movable contact buttons 15 and 16 separable within arcing chamber 13. Button 15 is illustrated as the stationary contact directly connected to socket contact 5. Button 16, on the other hand, is mounted on a disk or plate 17 movable within chamber 13. Suitable resilient or elastic means, such as a cylindrical rubber gasket or the like 18 biases plate 17 downwardly and consequently causes relative separation of the pair of separable contact buttons 15 and 16. Preferably disk 17 is supported on another cylindrical washer 19 of elastic material such as rubber, which bears against the bottom of disk 17 and also against insulating support 14, thereby effectively sealing chamber 13 against the propagation of any flame outside thereof and perhaps also against the entrance of any explosive atmosphere. The electrical circuit connected in parallel with disconnect contacts 5 and 6 in addition to separable contact buttons 15 and 16, includes a relatively weak spring 20 to maintain the parallel circuit after the primary disconnect contacts have been disengaged. Spring 20 is mounted within a metal cylinder 21 supported from insulating support 14. In telescopic engagement with cylinder 21 is a cylindrical member 22 terminating at its lower end in a spherical contact 22' which is adapted to engage the movable contact 6 of the primary disconnect 4. Spherical contact 22' engages with a conical seat 23 in movable contact 6, thereby providing a self-seating contact which will permit the accumulation of a small amount of foreign matter without destroying its conductivity. Cylindrical member 22 telescopically arranged with respect to tube 21 is provided with a shoulder 24 for engaging with a cooperating shoulder 25 on tube 21 to limit the maximum extension of spring 20.

In Fig. 1 the circuit interrupting device is shown with the primary disconnect contacts 4 in engagement. Upon lowering of the circuit interrupting device 1 the circuit between contacts 5 and 6 is first interrupted. Subsequent to the disengagement of the primary disconnect contacts 4 the parallel electrical circuit including contacts 15 and 16 is interrupted so that any arcing or "spitting" upon bodily lowering of circuit interrupting device 1 is confined within arcing chamber 13. The resilient cylindrical member 18 will cause separation of contacts 15 and 16 as soon as the circuit interrupting device is lowered sufficiently whereby spring 20 no longer maintains these contacts in the closed position.

The operation of the primary disconnect contacts embodying my invention is as follows: As the circuit interrupting device 1 is lowered out of position and contact is broken between contacts 5 and 6, contact 22' by virtue of the spring 20 follows movable contact 6. At this time spring 20 is still sufficiently compressed to hold the pair of separable contact buttons 15 and 16 in conducting engagement whereby the electrical circuit is still complete through the parallel path including contact buttons 15 and 16. As soon as a sufficient separation has been established between contacts 5 and 6, such for example as is illustrated in Fig. 2, the spring 20 reaches substantially its full extension and no longer exerts sufficient force against disk, or plate 17, to maintain contacting engagement of contact buttons 15 and 16. From this point on disk 17 is lowered under the biasing action of elastic means 18 until it reaches the position indicated in Fig. 2 whereby any current flowing in this circuit is interrupted within chamber 13. During all this time contact is maintained between contact 6 and contact 22'. After plate, or disk 17, has reached its lowermost position indicated in Fig. 2 and spring 20 has reached its maximum extension, further downward movement of the circuit interrupting device 1 will cause separation between contacts 6 and 22'. However, no arcing occurs at this time since the circuit has already been interrupted at contact buttons 15 and 16.

If explosive atmosphere were allowed to enter chamber 13 this chamber could be constructed so as to withstand the pressure generated by any explosion within chamber 13. Furthermore, communication of the explosion to the outside atmosphere is prevented by the arrangement described above.

While I have disclosed a specific embodiment of my invention, it should be understood that my invention is not limited to the specific details and construction thereof herein illustrated and I intend in the appended claims to cover all such changes and modifications as fall within the true spirit and scope of my invention.

What I claim as new and desire to secure by Letters Patent of the United States is:

1. In a circuit interrupting device having a plug contact and a cooperating contact socket, an arrangement for preventing residual currents from causing arcing in the atmosphere surrounding said device when said plug contact is withdrawn from said socket comprising resilient means mounted inside said socket and affixed thereto, a plate member mounted on said resilient means so as to form a fluid tight chamber defined by said plate member, said resilient means and a portion of the inside surface of said socket, a pair of relatively movable contacts mounted in said chamber and movable into engagement with each other when said resilient means is compressed, one of said relatively movable contacts being electrically connected to said contact socket, a pair of telescoping members mounted within the plug contact opening of said socket comprising a stationary member secured to said plate member and a cooperating movable member having a contact thereon for engaging said plug contact, and a compression spring interposed between said movable member and said plate member for compressing said resilient means to maintain said relatively movable contacts in engagement until after said plug contact has disengaged said socket and for maintaining said contact on said movable member in engagement with said plug contact until after said relatively movable contacts have parted.

2. In a circuit disconnecting device having a plug contact and a cooperating contact socket, an arrangement for preventing residual currents from causing arcing in the atmosphere surrounding said device when said plug contact is withdrawn from said socket comprising resilient means mounted inside said socket and maintained therein, a plate member cooperating with said resilient means so as to form a fluid-tight chamber defined by said plate member, said resilient means and a portion of the inside surface of said socket, a pair of relatively movable contacts mounted in said chamber and movable into engagement with each other when said resilient means is caused to yield, one of said relatively movable contacts being electrically connected to said contact socket, a pair of telescoping members mounted within the plug contact opening of said socket comprising a relatively stationary member secured to said plate member and a cooperating movable member having a contact thereon for engaging said plug contact, and a compression spring interposed between said movable member and said plate member for compressing said resilient means to maintain said relatively movable contacts in engagement until after said plug contact has disengaged said socket and for maintaining said contact on said movable member in engagement with said plug contact until after said relatively movable contacts have parted.

3. A disconnecting device for electrical switchgear including main contact means comprising a female type contact and a cooperating male type contact, and auxiliary contact means arranged in shunt relationship with respect to said main contacts, said auxiliary contact means comprising, a disk-like movable sparking contact structure, a fixed sparking contact cooperating therewith electrically connected to said female contact, supporting means secured within said female contact for limiting the opening travel of said disk-like contact, a first yieldable structure biasing said disk-like contact to open position, a second yieldable structure operatively engageable with said disk-like contact for opposing the bias of said first yieldable structure, said first yieldable structure including an insulating wall cooperating between said disk-like contact and an inner surface of said female contact so as to constitute a fluid-tight sparking chamber, and said second yieldable structure including an electrically conducting spring device of preponderating strength over that of said first yieldable structure arranged so as to be engaged by said male type contact whereby said auxiliary contact means is caused to close before the closure of said main contact means and conversely is caused to break contact after the separation of said main contacts.

WILFRED F. SKEATS.

REFERENCES CITED

The following references are of record in the file of this patent:

UNITED STATES PATENTS

| Number | Name | Date |
|---|---|---|
| 532,594 | Scott et al. | Jan. 15, 1895 |
| 1,250,402 | Wendelburg | Dec. 18, 1917 |
| 1,706,523 | Churcher | Mar. 26, 1929 |
| 2,095,729 | Beiersdorf | Oct. 12, 1937 |
| 2,239,031 | Bierenfeld et al. | Apr. 22, 1941 |
| 2,367,441 | Schwinn | Jan. 16, 1945 |
| 2,407,378 | Miller et al. | Sept. 10, 1946 |

FOREIGN PATENTS

| Number | Country | Date |
|---|---|---|
| 400,716 | Great Britain | Nov. 2, 1933 |